J. SULZER.
COMBUSTION ENGINE.
APPLICATION FILED JAN. 21, 1911.
1,097,567.
Patented May 19, 1914.
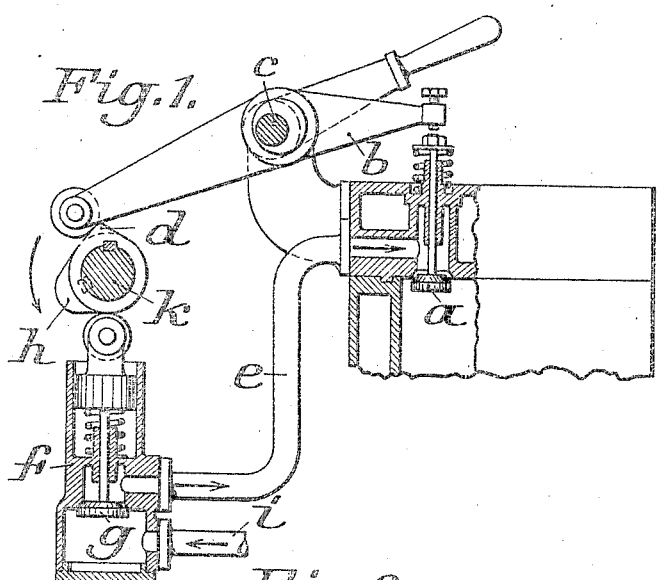
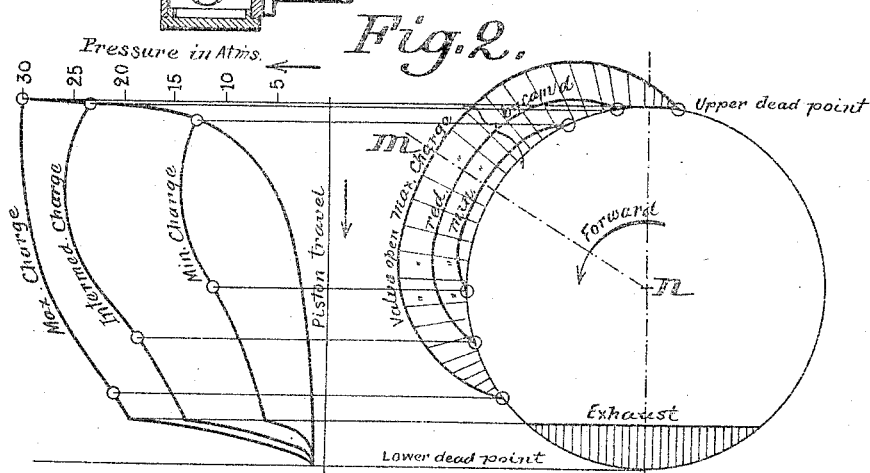
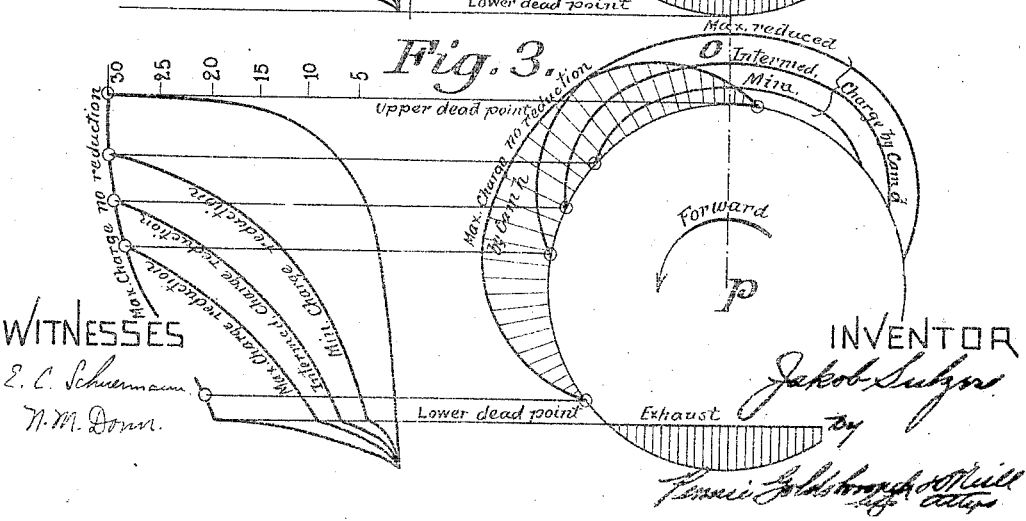

UNITED STATES PATENT OFFICE.

JAKOB SULZER, OF WINTERTHUR, SWITZERLAND, ASSIGNOR TO BUSCH-SULZER BROS.-DIESEL ENGINE COMPANY, OF ST. LOUIS, MISSOURI, A CORPORATION OF MISSOURI.

COMBUSTION-ENGINE.

1,097,567.  Specification of Letters Patent.  Patented May 19, 1914.

Application filed January 21, 1911. Serial No. 603,949.

*To all whom it may concern:*

Be it known that I, JAKOB SULZER, engineer, a citizen of the Swiss Republic, residing at 97 Langgasse, Winterthur, Switzerland, have invented certain new and useful Improvements in Combustion-Engines; and I do hereby declare the following to be a full, clear, and exact description of the invention, such as will enable others skilled in the art to which is appertains to make and use the same.

This invention is an improvement in air starting and reversing mechanisms for combustion engines and consists in an arrangement of valve-gearing for controlling the conditions of admission of compressed-air to the combustion cylinder or cylinders, whereby the supply of such air is conserved and the utility and general efficiency of the mechanism is improved. These results are brought about in part, according to the present invention, by controlling the air admission charges, throughout their whole range of variation from maximum charge to minimum charge, so that they will enter the cylinder always close to the dead center point, where the velocity of the piston is lowest, and through a passageway that is least subject to restriction, the said results being also accomplished in part, by the arrangement of the valve-gearing whereby the admissions of such charges of starting-air are always completed prior to the mid-stroke position of the piston, and by other features of the invention that will be made apparent below. In prior starting-mechanisms the point of admission to the cylinder of less than the maximum compressed air charges is later than the point of admission of the maximum charge, and hence while the piston is moving more rapidly, so that more or less of a throttling action is apparent upon the passage of the air, with consequent loss of efficiency.

The present invention eliminates the obvious objections accruing in existing mechanisms from these and other causes and thereby accomplishes the same ultimate effect with consequent substantial saving of the compressed air, which is of importance especially in marine and locomotive power plants.

The invention will be more readily understood by reference to the drawings wherein—

Figure 1 illustrates a portion of an engine cylinder with starting mechanism of this invention applied thereto; Fig. 2, on the righthand side, is a diagram in polar coördinates, of the valve-lift curves of the starting mechanism of an ordinary engine, not involving this invention, and on the lefthand side shows the expansion curves corresponding to the indicated valve-lifts thereof; Fig. 3 is a similar diagram of valve-lifts and resulting expansion curves of starting-mechanism employing this invention, and such as may be produced by the use of apparatus indicated by Fig. 1. In the diagrams of Figs. 2 and 3 the forward direction of the crank shaft rotation is assumed to be as marked by the arrows.

Referring first to Fig. 1, *a* represents the starting valve of a combustion engine to which compressed air is supplied by a conduit *e*. This valve is operated by a valve-lever *b* journaled on an eccentric fulcrum *c* which can be shifted by rocking its axis by the handle shown. The valve-lever is actuated by the cam *d* of an engine-driven cam shaft *k* so as to open the starting valve at the proper time and with a greater or less degree of lift according to the adjustment of the shiftable fulcrum. As thus far described the construction is the same in principle as many starting-gears heretofore proposed and the parts above referred to may therefore be assumed to represent the parts for carrying out the functions represented by the diagram in Fig. 2. With these parts the present invention combines a secondary or auxiliary air-valve *g* in a suitable auxiliary air chamber or valve casing *f* and which controls the passage of compressed air from the supply conduit *i* to the pipe *e* and the other valve. This secondary valve is provided with the necessary friction roller and spring to enable it to be opened and closed by the cam *h* also mounted on the cam shaft *k* in a different plane from the cam *d*. The two cams control the valves *a* and *g* in such manner as that one, for example, *a*, will remain open from a point at one side of the dead center to a point equally spaced therefrom on the opposite side while the other will open at or close to the dead center point and remain open until after the other has closed, the open periods of the two valves thus overlapping and producing the effects indicated by the diagram of Fig. 3, as will be explained below.

In the diagram of Fig. 2 the maximum lift of the starting valve, and which as above stated may be assumed to be the starting valve in an ordinary engine, corresponding to valve $a$, above described, is represented by the outer curved line, marked "max. charge" and, the open period, as will be observed, extends from a point just in advance of the upper dead center to a point just in advance of the exhaust, thus providing for the maximum volume of compressed air admission. The radius-vector $m$—$n$ which bisects this curve, represents its axis and all lesser degrees of valve lift will also be found to be substantially bisected by the same axis, that is to say, will be symmetrical thereto. Thus, as shown by the diagram, the next inner curve, marked "red.", shows a reduced or intermediate valve-lift and the curve marked "min." shows a minimum valve-lift. The axis of symmetry for each of these valve-lifts, being substantially the same for all, assumes an angle on the diagram corresponding to a point in the working cycle about midway between the upper dead center point, where the piston is stationary, and the midstroke point where it is moving at its highest velocity. The corresponding pressure effects, for the position of the axis of symmetry are shown by the card diagrams projected to the lefthand side of Fig. 2, where the relative pressure is indicated in atmospheres.

The obliquity of the axis of symmetry, it may be here explained, arises from the necessity of employing maximum air charges of mostly above 60% of the cylinder volume, in order to start engines from any crank position, the consequence of which, is that in reducing the charge, the closing and opening actions of the valve (valve $a$) both occur more closely to this line of symmetry, so that as a result of the retarded opening action, and the throttling effect during the admission (by virtue of the coincident piston velocity) as well as the retarded closing of the valve, the pressure diagrams, as projected at the lefthand side of Fig. 2, show an insufficient utilization of the compressed air energy. From the diagram it will be immediately seen that as the valve lift is decreased, a reduction in the consumption of compressed air takes place only to a very limited extent, the pressure of the air being still relatively high, when exhausting.

Fig. 3 shows as already stated how the defects of the starting gear as illustrated by Fig. 2 are obviated. According to this invention, the admission of air to the working cylinder is attained by the coöperation of both valves $a$ $g$. The cam $d$ controls the starting valve proper, (valve $a$) and the cam $h$ controls the intermediate or secondary starting valve (valve $g$). The latter valve $g$ is controlled, i. e., opened and closed without variation and the valve-lift thereof corresponds in point of time and extent to the valve-lift marked "max. charge" in Fig. 2, being indicated in Fig 3 in the same manner. The intermediate valve $g$ is therefore always raised shortly prior to the upper dead-point and represents a constantly uniform charge of, as a rule, above 60% of the cylinder volume. The main starting valve $a$ however is controlled for a variable function. It is characteristic of the manner of its regulation that its axis of symmetry for its individual charges coincides with the dead-center line which in Fig. 3 is indicated by the line $o$—$p$. The result attained thereby is, on the one hand, that the main valve $a$ is already fully open in the dead-center position for all charges so that therefore the opening of the air inlet to the cylinder is effected always in the dead-center position by the intermediate valve $g$ and on the other hand that in using the invention for reversible combustion engines a reversal of all of the main valves $a$, in a multicylinder engine for example, as avoided. The direction of the engine may thus be varied solely by the operation of the intermediate valves without danger of interfering with the controllability of the starting gear. The closing of the main valves, both for forward and backward running of the engine, takes place symmetrically to the dead-center line and hence with only a negligible throttling effect because of the low piston velocity at this point. That is to say, such throttling of the incoming compressed air is without effect for the reason that the range of the valve lift is moved close to the dead-center and therefore close to the period of the smallest piston velocity, whereas in the case of Fig. 2 the area representing the valve elevation for small charges lies toward the center of the stroke, that is to say, near the greatest velocity of the piston. It is moreover to be noted that the valve $a$ may remain open during the complete revolution of the controlling shaft $k$ when the roller on the lever $b$ by corresponding adjustment of the eccentric $c$ is moved down to the circular base of the cam $d$, and that a reduction of the valve-throw and of the valve lifting duration takes place when the roller on the lever $b$ is lifted away from the cam $d$.

In Fig. 3 the valve lifting extents are indicated in the same manner as in Fig. 2, first of all without the reduction due to the cam $h$ and then with increasing reduction of the charge effected by the cam $d$. The coöperation of the main valve *a* with the auxiliary valve *g* is characterized in all conditions of the regulation by the fact that the opening action for admitting air to the cylinder by means of the auxiliary valve *g* occurs in a constant manner prior to the upper dead-center whereas the cut-off of the air inlet by the main valve *a* occurs at variable distances of the piston from the upper dead-center point. Fig. 3 shows clearly that all of the valve closing stages due to the action of the main valve occupy a position between the stroke center and the upper dead-center point as distinguished from Fig. 2 wherein the valve closing stages occur between stroke center and lower dead-center point, which in the diagram is expressed by the increased degree of expansion of the starting air. A comparison with Fig. 2 will indicate the superior pressure effects attained by this invention and particularly the average diminution of the exhaust pressures.

Thus in combustion engines working with, or started by means of, compressed air the present invention enables a complete utilization of the compressed air energy to be attained, and with small air charges, by causing on the one hand the admission of the starting air to take place in the period of the lowest piston velocity and smallest throttling and on the other hand by increasing the degree of expansion of the starting air for decreasing charges in proportion to the decrease of the charge.

What I claim is:—

1. Means for operating combustion engines with compressed air comprising two independent valves for controlling the admission of compressed air to the engines, means for operating one of such valves with a uniform lift and a period which includes a portion of the working stroke and means for operating the other valve with a variable lift and a period which extends over substantially equal portions of the engine cycle before and subsequent to the dead center point.

2. In a combustion engine, starting mechanism comprising two valves, an inlet to the engine cylinder controlled thereby, an engine-driven cam shaft for operating both such valves and means for variably controlling the operation of one of such valves.

3. Air-starting mechanism for combustion engines comprising an inlet passage to the engine cylinder, two valves in control thereof, and engine driven means for operating such valves with open periods which overlap between the dead center and mid-stroke points of the cycle.

4. In a combustion engine started by compressed air, a conduit leading from a source of compressed air to the cylinder of the engine, a valve controlling the admission of air from said conduit, a valve controlling the admission of air to said conduit, means for opening said first mentioned valve and means for controlling at will the time of opening said first mentioned valve relatively to the position of the piston of the engine all substantially as described and for the purpose specified.

5. In air-starting mechanism for combustion engines, a conduit for admitting compressed air to the engine cylinder and two valves for controlling the passage of air therethrough, in combination with valve operating means adapted to open one of such valves with an open period symmetrically arranged with respect to the dead center point and the other with an open period coincident with a portion of the expansion or working stroke, and means for varying the air admission through the first-mentioned valve.

6. In a combustion engine adapted to be started by compressed air, the combination of an air conduit, a valve controlling the connection of such conduit with the engine cylinder and provided with means for varying the extent to which it opens, a second valve controlling the admission of air to said conduit and means for holding said valve open during the major portion of each working stroke.

7. In a combustion engine started by compressed air, the combination of a cylinder valve controlling admission of starting air to the cylinder, a valve lever therefor mounted on an adjustable fulcrum, a second valve controlling the passage of compressed air to the said cylinder valve, means for holding said second valve open during a major portion of each working stroke and means for shifting the fulcrum of the valve lever.

In testimony whereof I have affixed my signature, in presence of two witnesses.

JAKOB SULZER.

Witnesses:
 CARL CUBLER,
 THEODOR REUTER.